Mar. 6, 1923.  
J. T. BOOTH.  
INTERNAL COMBUSTION ENGINE.  
FILED AUG. 28, 1922.  
1,447,752.  
6 SHEETS—SHEET 4.

Patented Mar. 6, 1923.

1,447,752

UNITED STATES PATENT OFFICE.

JOHN THOMAS BOOTH, OF BIRMINGHAM, ENGLAND.

INTERNAL-COMBUSTION ENGINE.

Application filed August 28, 1922. Serial No. 584,746.

*To all whom it may concern:*

Be it known that I, JOHN THOMAS BOOTH, subject of the King of Great Britain, residing at 69 Stafford Road, Handsworth, Birmingham, in the county of Warwick, England, have invented certain new Improvements in Internal-Combustion Engines; and I do hereby declare the following to be a full, clear, and exact description of the same.

This invention relates to internal combustion engines and is primarily intended for two stroke engines. The object of the present invention is to provide an improved construction whereby a definite volume of gas at a definite pressure is supplied to the cylinder at each operation of the cycle.

My invention is particularly applicable to two cylinder two stroke engines or to engines which have multiples of two cylinders but it can also be applied to single cylinder two stroke engines.

In carrying out my invention I prefer to make use of pumping chambers in which operate enlargements of the working pistons in the well known manner, the pumping chambers being formed at the lower or forward ends of the working cylinders.

According to the present invention the inlet of gas to the pumping chambers is controlled by a rotary valve and the passage of gas from the pumping cylinders to the working cylinders is also controlled by a rotary valve.

In conjunction with the rotary valve controlling the inlet and transfer of the gas, I prefer to provide a receiving chamber to which the gas is delivered before it passes to the working cylinders and this receiving chamber is provided with a suitable valve for controlling the passage of gas therefrom to the working cylinders. This valve may be operated by a connection from the rotary valve before mentioned.

Another feature of my invention is that I may provide means for altering the capacity of the receiving chamber so that the pressure of the gas delivered to the working cylinders can be altered as desired.

Referring to the drawings:—

In the construction illustrated in Figures 1 to 4 of the accompanying drawings, the lower ends of the working cylinders 1 are provided with enlarged portions 2 in which work enlarged pistons 3 formed with the ordinary working piston 4 in the well known way. These enlarged cylinders 2 form the pumping chambers.

Figure 1:
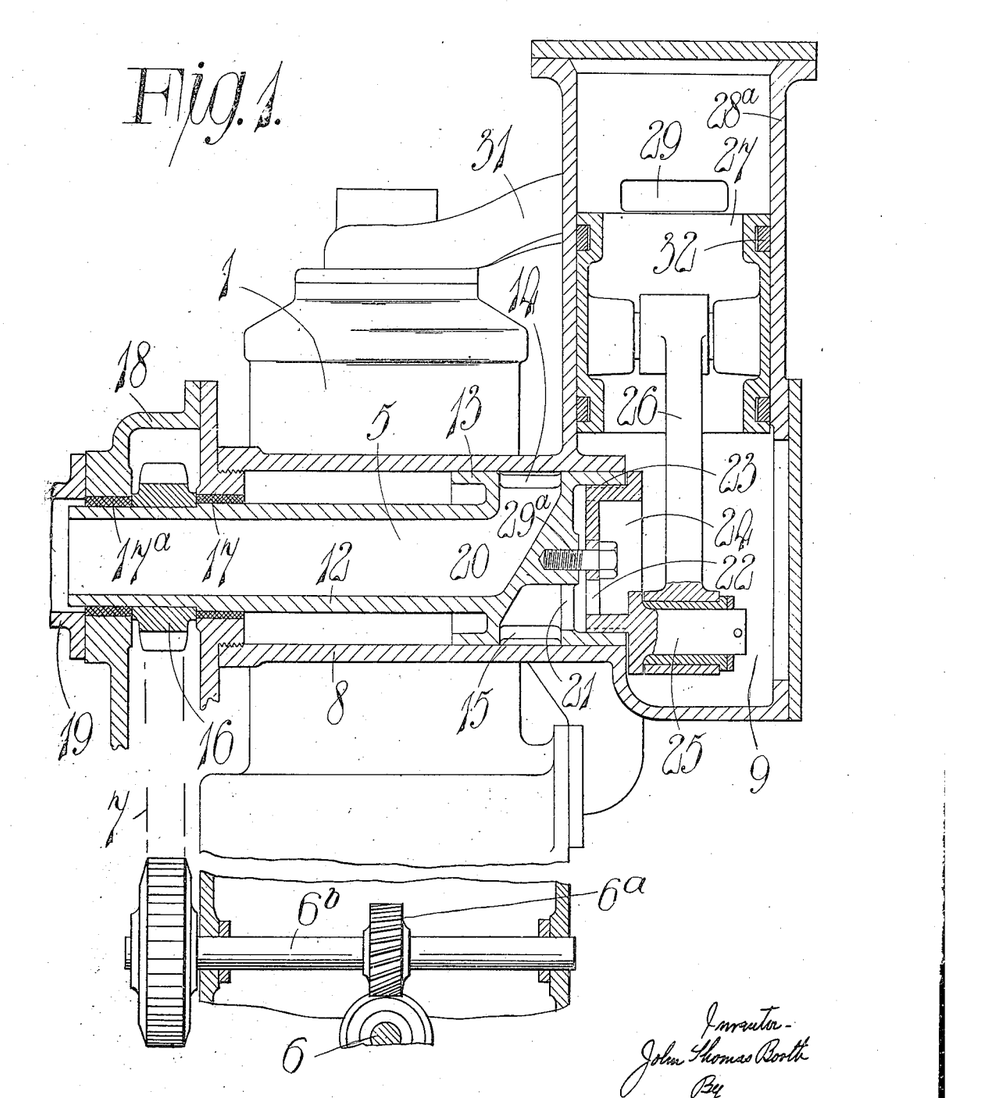
Figure 1 is a part sectional side elevation of a twin-cylinder engine according to this invention, the section being taken through the axis of the rotary valve and receiver.
Figure 2:
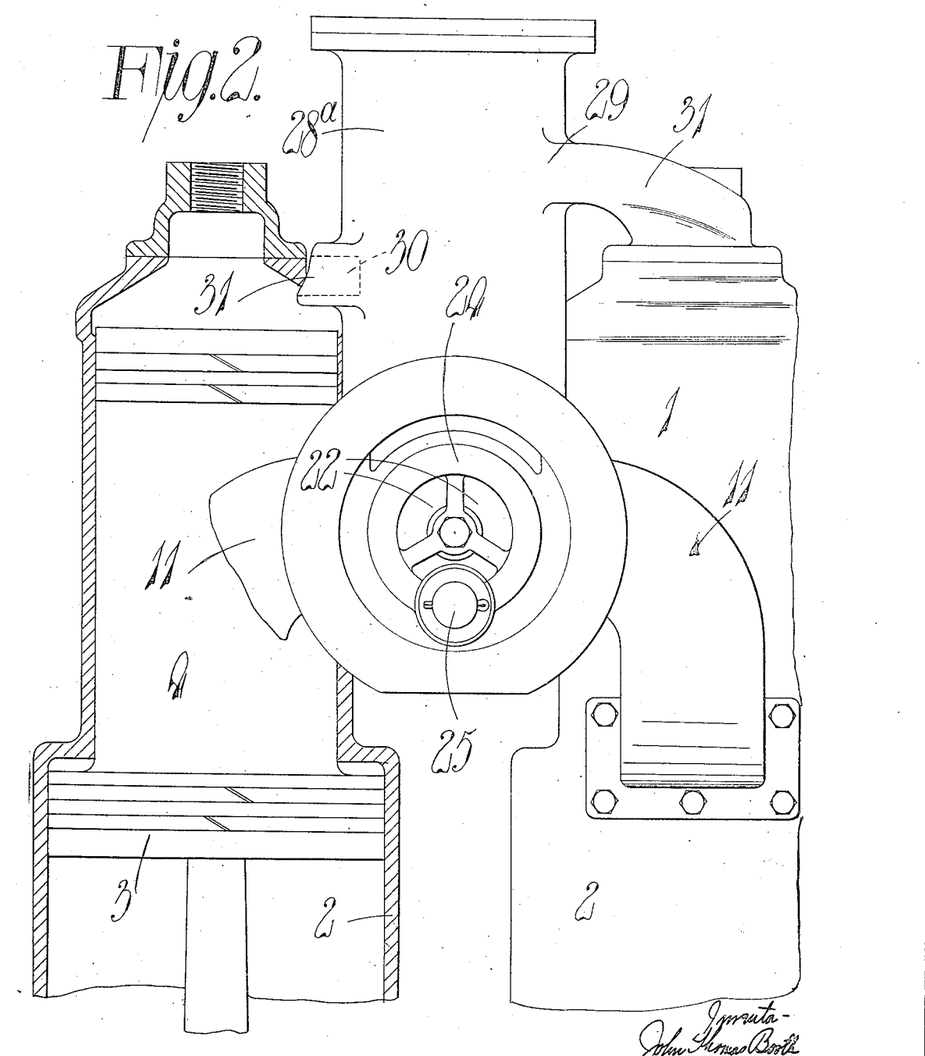
Figure 2 is a front view of same with one of the working cylinders in section and with the cover plate and the connecting rod removed from the receiver.

As shown in Figures 1 and 2 the inlet of gas to the pumping chamber of the two working cylinders is controlled by the rotary valve 5 arranged upon an axis at right angles to the working cylinders 1 and passing between them. This rotary valve 5 is shown driven direct from the main crank shaft 6, through the gearing 6ª and shaft 6ᵇ, by means of a silent chain 7, but it may be driven in any other suitable way.

The rotary valve 5 works in a cylinder 8 opening at one end into the receiver 9 which is arranged on an axis parallel to the working cylinders 1. Near the receiver end the cylinder 8 is provided with ports 10, see Figure 10, disposed at opposite ends of a horizontal diameter, these ports 10 communicate by means of pipes 11 of rectangular section, one to each of the pumping cylinders 2. The valve 5 which rotates inside the cylinder 8 comprises a tubular shank portion 12 and an enlarged head portion 13 containing the ports 14 and 15 arranged diametrically opposite one another. The open end of the tubular shank portion 12 remote from the receiver carries a chain sprocket wheel 16, and is supported in bearings 17 and 17a in the chain casing members 18. The end of the induction pipe 19 is secured to the casing 18 so as to be in communication with the tube 12.

The tube 12 is in communication with the port 14 in the head 13, but is isolated from the port 15 by means of the sloping diaphragm 20. When the port 14 is opposite one of the ports 10, gas passes from the induction pipe 19 along the tube 12, through the ports 14 and 10 along pipe 11 to the appropriate pumping cylinder 2, whose piston 3 is on the downstroke. At the same time the port 15 is opposite the other port 10 and gas is forced from the other pumping cylinder which is connected thereto through the ports 10 and 15 and through the passages 21 and 22 into the receiver. On the valve moving through half a revolution the reverse action takes place.

Figure 5:
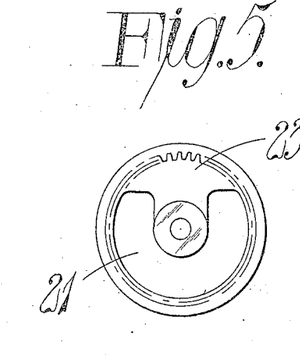
Figure 5 is an end view of the receiver end of the rotary valve.
Figure 6:
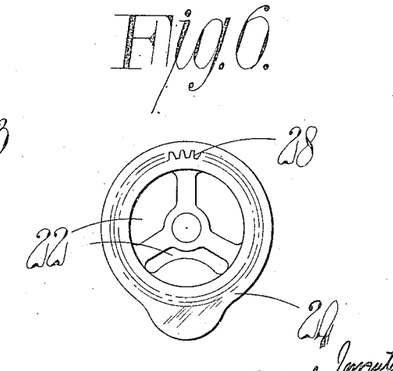
Figure 6 is a similar view showing the adjustable crank pin fitting for this end of the rotary valve.

The head 13 of the rotating portion is provided with a cylindrical recess 23 into which is secured a fitting 24 carrying a crank pin 25, to which is attached a connecting rod 26 driving a sleeve valve 27 working in the receiver 9. The fitting 24 is provided with a toothed portion 28 which fits into the toothed recess 23 (see Figures 5 and 6) and is secured therein by means of a set screw 29a. The fitting 24 is provided with the passages 22 for the transfer of the gas to the receiver.

The above is one convenient method of making the setting of the two valves relative to one another adjustable. This sleeve valve 27 is open at both ends and works in the cylindrical portion 28a of the receiver 9. This cylindrical portion 28a is provided with the two ports 29 and 30 Figure 10 which are shown at different levels but may be at the same level and on opposite sides of the receiver, these ports communicating by pipes 31, one to the head of each working cylinder 1. Since the sleeve is open at each end and slides in a chamber of constant volume, the pressure of the gas delivered to the working cylinders will not be altered when the position of the valve is altered.

The sleeve 27 is arranged to uncover the port 29 as soon as the working piston in the cylinder with which port 29 communicates has uncovered the exhaust ports in the said cylinder, i. e., towards the end of the explosion stroke, and similarly for the other working cylinder. When the ports are at different levels, the sleeve will be so arranged that it uncovers port 29 at one end of its stroke and port 30 at the other end of its stroke, the one port being completely closed before the other opens. The sleeve is provided with the piston rings 32 to prevent leakage from either of the ports into the receiver during the explosion stroke of the working cylinder.

Figure 3:
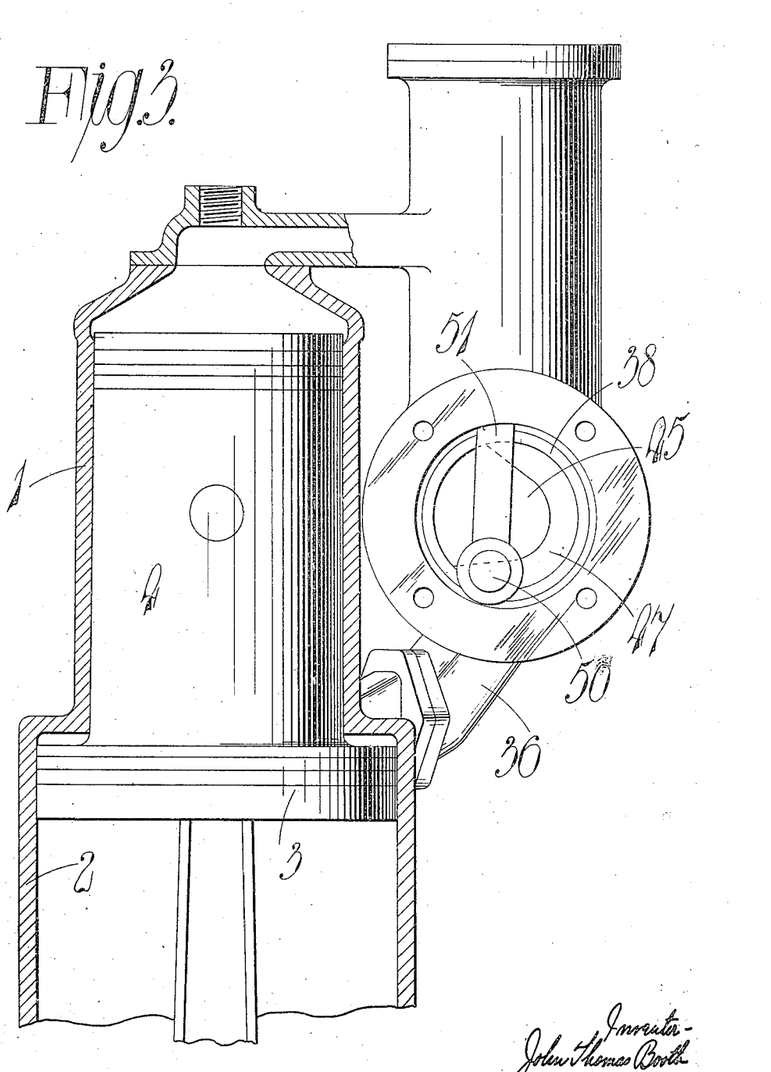
Figure 3 is a side elevation partly in section of a single cylinder engine according to this invention, the cover plate being removed from the face of the receiver.
Figure 4:
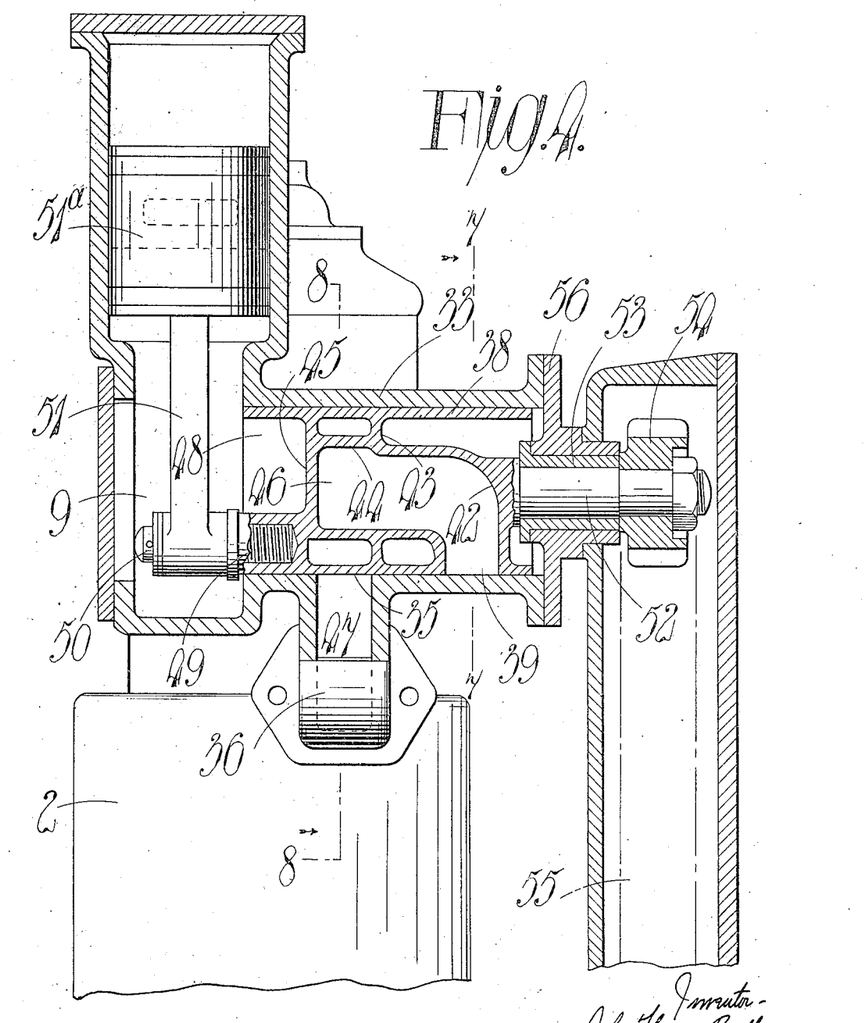
Figure 4 is a front view of the same showing the rotary valve and receiver in section.
Figures 7, 8:
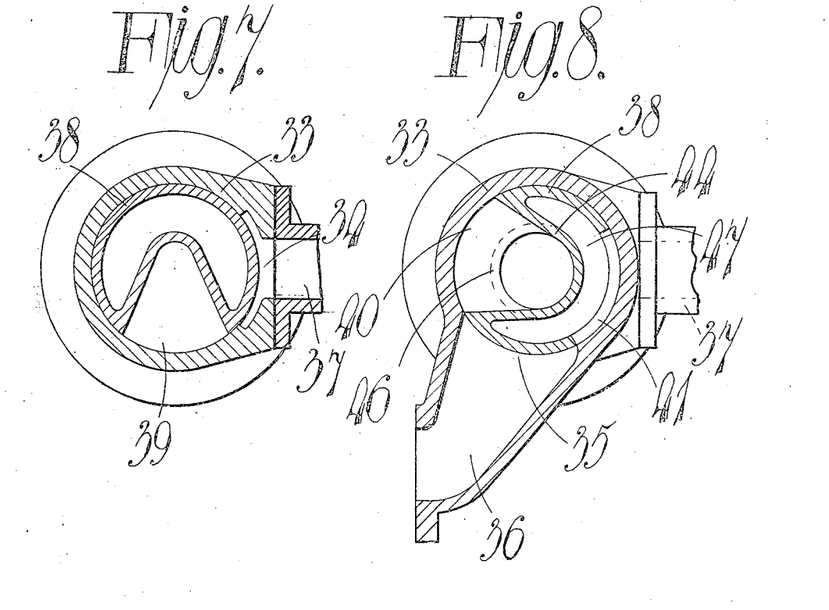
Figure 7 is a section on line 7—7 in Figure 4.
Figure 8 is a section on line 8—8 in Figure 4.

In the construction shown in Figures 3 and 4, the invention is shown applied to a single cylinder engine, and in this case a rotary valve of slightly different construction is illustrated. The valve works in a cylindrical casing member 33, one end of which opens into the receiver 9 as before. This casing 33 is provided with a port 34 (see Figures 7 and 8) to which the induction pipe 37 is secured, and which is arranged on the front of the casing 33 in respect to Figure 4, at the end remote from the receiver. At the receiver end the cylinder is provided with a port 35 on its under side, this port communicating with the pumping cylinder 2 by means of the pipe 36. The valve includes a sleeve portion 38 having ports, 39, 40 and 41 (see Figures 4, 7 and 8). Leading from the port 39, which is so arranged as to communicate with the port 34 in the casing once per revolution, is a tube member 42 which extends first perpendicularly to the axis of the sleeve and joins an annular diaphragm 43 which extends around the sleeve. On the receiver side of the member 43 is a curved diaphragm 44 and a plate member 45, formed as shown in Figure 4 and adapted to isolate the passage through the tube 42, from the receiver.

When the port 39 comes opposite the port 34 in the casing, gas is sucked in from the induction pipe along the tube 42, through the central hole of the annular member 43 and into the chamber 46 formed between the curved diaphragm 44 and the members 43 and 45. At this moment the chamber is so disposed that its port 40 is open to port 35 in the casing 33 and so in communication with the pumping cylinder 2, the piston of which is on the downstroke. When the valve has passed through another half revolution, i. e. on the upstroke of the pump piston, the port 41 in the sleeve 38 is opposite port 35 and the gas is pumped up through these ports into passage 47 and so on through the open end 48 of the sleeve into the receiver 9.

The receiver end of the sleeve 38 is provided with a lug 49 carrying a crank pin 50 and actuating the connecting rod 51 which operates the receiver sleeve valve 51a as before. The end of the sleeve remote from the receiver is provided with an axial projection 52 mounted in a bearing 53 in the detachable end 56 of the casing, and carrying a chain sprocket 54 which is driven by means of a silent chain 55 from the crank shaft through the medium of spiral gears.

Figures 9, 10:
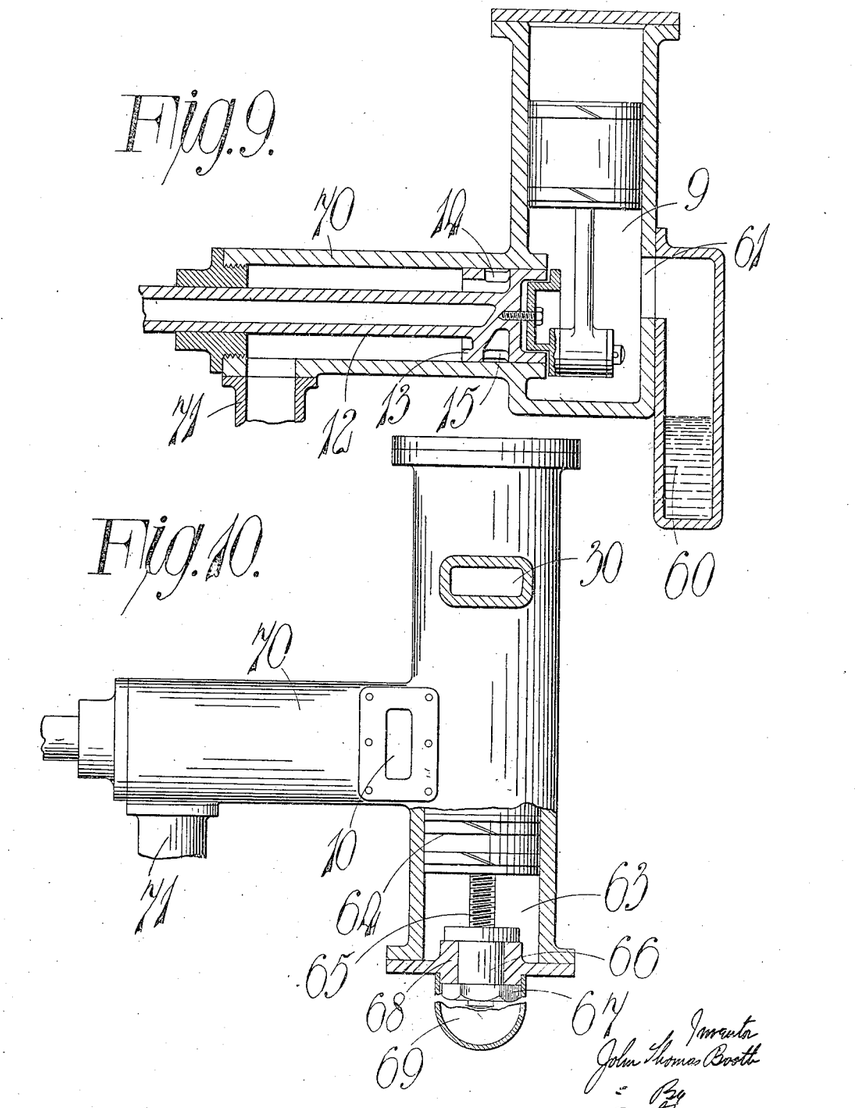
Figure 9 is a sectional elevation of a modified construction of the receiver.
Figure 10 is a part sectional elevation of a further modified construction of the receiver.

In the forms of rotary valve and receiver shown in Figures 9 and 10, means are provided for varying the volume of the receiver and thus altering the resultant pressure of the gas. In Figure 9 the receiver body 9 is provided with a chamber 60 which is secured on to the lower end of one of its faces, there being a passage 61 between the two chambers. This chamber 60 is adapted to contain oil, the height of which may be varied by suitable means so as to vary the combined volume of the receiver 9 and auxiliary chamber 60.

In the construction shown in Figure 10, the receiver 9 is provided with an extension 63 at its lower end in which is arranged a piston 64 provided with a screwed sleeve 66 having a nut head 67 and rotatably mounted in the base 68 of the extension 63. The nut 67 is disposed on the exterior of the casing and can be rotated so as to adjust the position of the piston and so alter the capacity of the receiver. A cap 69 is provided to cover up the nut and the end of the piston rod.

In these two constructions, the induction pipes 71 are secured on to the under side of the rotary valve casings 70 and the gas passes along the outside of the tubular shank 12, instead of through the tube 12, as shown in Figures 1 and 2, the head 13 being modified accordingly. The tube 12 may be used in this case as an oil passage, ducts being provided in the head 13 to convey the oil to the bearing surfaces of the rotary head and the crank pin.

What I claim then is:—

1. An internal combustion engine having at least one working cylinder, pumping means for the fuel associated with the said working cylinder, a receiver communicating with the cylinder and with the pumping means through which the fuel passes from the pump to the working cylinder, a rotary valve, a primary passage through said rotary valve for the inlet of fuel to said pumping means, a secondary passage through said rotary valve for the transfer of the fuel from the pumping means to the receiver, a reciprocating valve for controlling the transfer of gas from the receiver to the working cylinder, and means for operatively connecting the two valves.

2. An internal combustion engine having at least one working cylinder, pumping means for the fuel associated with the said working cylinder, a receiver communicating with the cylinder and with the pumping means through which the fuel passes from the pump to the working cylinder, a rotary valve, a primary passage through said rotary valve for the inlet of fuel to said pumping means, a secondary passage through said rotary valve for the transfer of the fuel from the pumping means to the receiver, an open ended reciprocating valve in said receiver for controlling the transfer of gas from the receiver to the working cylinder, this valve having both ends open whereby the volume of the receiver will remain unaltered when the valve is moved, and means for operatively connecting the two valves.

3. An internal combustion engine having at least one working cylinder, pumping means for the fuel associated with the said working cylinder, a receiver communicating with the cylinder and with the pumping means through which the fuel passes from the pump to the working cylinder, a rotary valve for controlling the passage of the fuel to said pumping means and from the said pumping means to the receiver, and means for adjusting the effective volume of the receiver.

4. An internal combustion engine having at least one working cylinder, pumping means for the fuel associated with said working cylinder, a receiver communicating with the cylinder and with the pumping means through which the fuel passes from the pump to the working cylinder, a rotary valve for controlling the passage of the fuel to said pumping means and from the said pumping means to the receiver, a reciprocating valve in said receiver for controlling the transfer of gas from the receiver to the working cylinder, this valve having both ends open whereby the volume of the receiver will remain unaltered when the valve is moved and means for adjusting the effective volume of the receiver.

5. An internal combustion engine having at least one working cylinder, pumping means for the fuel associated with the said working cylinder, a receiver communicating with the cylinder and with the pumping means through which the fuel passes from the pump to the working cylinder, a rotary valve for controlling the passage of the fuel to said pumping means and from the said pumping means to the receiver, a reciprocating valve in said receiver for controlling the transfer of gas from the receiver to the working cylinder, this valve having both ends open whereby the volume of the receiver will remain unaltered when the valve is moved, means for operatively connecting the two valves and means for adjusting the effective volume of the receiver.

6. An internal combustion engine having at least one working cylinder, pumping means for the fuel associated with the said working cylinder, a receiver communicating with the cylinder and with the pumping means through which the fuel passes from the pump to the working cylinder, a rotary valve, primary and secondary passages extending through said rotary valve, having outlets in the periphery of said valve for the inlet and transfer of the fuel to and from the pump, a cylinder for containing said rotary valve, having a port in alignment with both of the outlets in the valve, adapted to periodically open the outlets separately, a passage communicating with the port in the cylinder to convey the fuel to the pumping means, an outlet passage in this ported cylinder communicating periodically with the said secondary passage in the valve and opening into the receiver for the conveyance of fuel thereto, and a reciprocating valve in said receiver for controlling the transfer of gas from the receiver to the working cylinder, this valve having both ends open whereby the volume of the receiver will remain unaltered when the valve is moved and means for operatively connecting the two valves.

7. An internal combustion engine having at least one working cylinder, pumping means for the fuel associated with the said working cylinder, a receiver communicating with the cylinder and with the pumping means through which the fuel passes from the pump to the working cylinder, a rotary valve for controlling the passage of the fuel to the said pumping means and from the said pumping means to the receiver, a reciprocating valve in said receiver for controlling the transfer of gas from the receiver to the working cylinder, this valve having both ends open whereby the volume of the receiver will remain unaltered when the valve is moved, a device for converting rotary motion into linear motion on the end of the valve, means for connecting the said device to the reciprocating valve whereby it is operated by the rotary valve, and means for adjusting said device relative to the angular position of the rotary valve.

8. An internal combustion engine having at least one working cylinder, pumping means for the fuel associated with the said working cylinder, a receiver communicating with the cylinder and with the pumping means through which the fuel passes from the pump to the working cylinder, a rotary valve controlling the passage of the fuel to said pumping means and from the said pumping means to the receiver, a reciprocating valve in said receiver for controlling the transfer of gas from the receiver to the working cylinder, this valve having both ends open whereby the volume of the receiver will remain unaltered when the valve is moved, a device for converting rotary motion into linear motion on the end of the rotary valve, means for connecting the said device to the reciprocating valve whereby it is operated by the rotary valve, means for adjusting said device relative to the angular position of the rotary valve, and means for adjusting the effective volume of the receiver.

9. An internal combustion engine having at least one working cylinder, pumping means for the fuel associated with the said working cylinder, a receiver communicating with the cylinder and with the pumping means through which the fuel passes from the pump to the working cylinder, a rotary valve for controlling the passage of the fuel to said pumping means and from the said pumping means to the receiver, and an adjustable member in said receiver for varying the effective volume thereof.

10. An internal combustion engine having at least one working cylinder, pumping means for the fuel associated with the said working cylinder, a receiver communicating with the cylinder and with the pumping means through which the fuel passes from the pump to the working cylinder, means for adjusting the effective volume of the receiver, a rotary valve for controlling the passage of the fuel to said pumping means and from the pumping means to the receiver, a ported cylinder for containing said rotary valve, an inlet passage communicating with one port in the cylinder for the passage of the fuel to the pumping means, a transfer passage communicating with said pumping means and with a second port in the cylinder for the passage of the fuel from the pumping means to the ported cylinder, an outlet passage for the passage of the gas from the ported cylinder into the receiver, means for driving said rotary valve, a valve for controlling the transfer of gas from the receiver to the working cylinder, means for transmitting the motion from the said rotary valve to the other valve, which means are disposed upon the end of said rotary valve and within the reservoir, means for connecting the said motion transmitting means to the valve for controlling the passage of gas from the receiver to the working cylinder and means for adjusting the position of the motion transmitting means relative to the said rotary valve.

11. An internal combustion engine having at least one working cylinder, pumping means for the fuel associated with the said working cylinder, a receiver communicating with the cylinder and with the pumping means through which the fuel passes from the pump to the working cylinder, means for adjusting the effective volume of the receiver, a rotary valve for controlling the passage of the fuel to said pumping means and from the said pumping means to the receiver, a ported cylinder for containing said rotary valve, an inlet passage communicating with one port in the cylinder for the passage of the fuel to the pumping means, a transfer passage communicating with said pumping means with a second port in the cylinder for the passage of the fuel from the pumping means to the ported cylinder, an outlet passage for the passage of the gas from the ported cylinder into the receiver, a reciprocating valve in said receiver for controlling the transfer of gas from the receiver to the working cylinder, this valve having both ends open whereby the volume of the receiver will remain unaltered when the valve is moved, a device for converting rotary motion into linear motion on the end of the rotary valve, means for connecting the said device to the reciprocating valve whereby it is operated by the rotary valve, and means for adjusting said device relative to the angular position of the rotary valve.

In witness whereof I affix my signature.

JOHN THOMAS BOOTH.